United States Patent
Sugiyama et al.

(10) Patent No.: US 10,816,093 B2
(45) Date of Patent: Oct. 27, 2020

(54) PARKING LOCK MECHANISM

(71) Applicant: TOYOTA JIDOSHA KABUSHIKI KAISHA, Toyota-shi, Aichi (JP)

(72) Inventors: Masataka Sugiyama, Toyota (JP); Kenji Tanabe, Toyota (JP); Takeshi Kuwahara, Toyota (JP); Ryoki Ii, Toyota (JP); Kenji Asai, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 21 days.

(21) Appl. No.: 16/288,702

(22) Filed: Feb. 28, 2019

(65) Prior Publication Data

US 2019/0264808 A1    Aug. 29, 2019

(30) Foreign Application Priority Data

Feb. 28, 2018  (JP) ................. 2018-035970

(51) Int. Cl.
*F16H 63/34*    (2006.01)
*B60T 7/10*    (2006.01)
(Continued)

(52) U.S. Cl.
CPC .......... *F16H 63/3425* (2013.01); *B60K 6/48* (2013.01); *B60T 1/005* (2013.01); *B60T 1/062* (2013.01);
(Continued)

(58) Field of Classification Search
CPC .. F16H 63/3425; F16H 63/3433; B60T 7/104; B60T 7/085; B60T 7/105;
(Continued)

(56) References Cited

U.S. PATENT DOCUMENTS

2009/0200134 A1* 8/2009 Shintani .......... B60T 1/005
192/219.5
2017/0254374 A1* 9/2017 Fukami .......... F16D 41/07

FOREIGN PATENT DOCUMENTS

CA        2773343    *  5/2012
DE  102009027759 A1    1/2011
(Continued)

OTHER PUBLICATIONS

Machine language translation of JP 55-164275.*
Oct. 1, 2018 U.S. Appl. No. 16/148,131 in the name of Hidehiko Banshoya et al.

*Primary Examiner* — Mark A Manley
(74) *Attorney, Agent, or Firm* — Oliff PLC

(57) ABSTRACT

A parking lock mechanism comprises: a parking gear disposed on a power transmission member mechanically coupled to a drive wheel; and a parking pawl provided with a lock claw configured to mesh with the parking gear and switching between a lock state in which the lock claw is meshed with the parking gear and an unlock state in which meshing between the lock claw and the parking gear is released. In the mechanism, the lock claw includes a first end surface and a second end surface opposite to each other in a face width direction, the lock claw includes a tooth tip surface provided with a retreated portion at a corner on the second end surface side, and a position of a center of gravity of the parking pawl is on the second end surface side relative to a center plane in the face width direction of the lock claw.

8 Claims, 12 Drawing Sheets

(51) Int. Cl.
    *B60T 1/00*         (2006.01)
    *F16D 63/00*       (2006.01)
    *B60K 6/48*         (2007.10)
    *B60T 1/06*         (2006.01)
    *B60T 7/08*         (2006.01)
    *F16D 127/02*     (2012.01)
    *F16D 127/06*     (2012.01)

(52) U.S. Cl.
    CPC .............. *B60T 1/067* (2013.01); *B60T 7/085* (2013.01); *B60T 7/104* (2013.01); *B60T 7/105* (2013.01); *F16D 63/006* (2013.01); *F16D 2127/02* (2013.01); *F16D 2127/06* (2013.01)

(58) Field of Classification Search
    CPC .......... B60T 1/005; B60T 1/062; B60T 1/067; F16D 63/006; F16D 2127/02; F16D 2127/06; F16D 2127/00–12; F16D 2250/0023; F16D 2300/22; B60K 6/48; B60K 6/445
    USPC ....................................................... 192/219.5
    See application file for complete search history.

(56) References Cited

FOREIGN PATENT DOCUMENTS

| | | | |
|---|---|---|---|
| JP | 55-164527 | * | 12/1980 |
| JP | S61-024351 U | | 2/1986 |
| JP | H06-049849 U | | 7/1994 |
| JP | 2015-054574 A | | 3/2015 |

* cited by examiner

PARKING LOCK MECHANISM

This application claims priority from Japanese Patent Application No. 2018-035970 filed on Feb. 28, 2018, the disclosure of which is herein incorporated by reference in its entirety.

BACKGROUND OF THE INVENTION

Field of the Invention

The present invention relates to a structure of a parking lock mechanism included in a vehicle.

Description of the Related Art

There is known a parking lock mechanism including a parking gear disposed on a power transmission member mechanically coupled to a drive wheel, and a parking pawl having a lock claw which meshes with the parking gear and disposed pivotably around a pivoting shaft disposed parallel to a rotation axis of the parking gear so as to allow the lock claw to mesh with the parking gear for non-rotatably locking the parking gear. For example, this corresponds to the parking lock mechanism described in Patent Document 1. In the parking lock mechanism disclosed in Patent Document 1, a retreated portion is disposed at a corner on one end surface side in a face width direction of a tooth tip surface of the lock claw coming into contact with the parking gear first when the parking pawl starts meshing with the parking gear, thereby reducing the contact surface pressure of the lock claw at the start of meshing so that chipping of the lock claw is suppressed.

CITATION LIST

Patent Document 1: Japanese Laid-Open Patent Publication No. 2015-54574

SUMMARY OF THE INVENTION

Technical Problem

Even when the parking pawl attempts to mesh with the parking gear, the lock claw of the parking pawl is repelled by meshing teeth of the parking gear if a vehicle runs at a predetermined vehicle speed or more, and the parking pawl is caused to pivot in a reciprocating manner around a pivoting shaft inserted through a through-hole thereof and repeatedly collide with the parking gear. Such a running state is referred to as a ratcheting running. In the parking lock mechanism described in Patent Document 1, the position of the center of gravity of the parking pawl is on a center plane in the face width direction with respect to the face width direction of the lock claw. Therefore, during the ratcheting running, the parking pawl also shakes around the position of the center of gravity due to collision with the parking gear within a range allowed by a backlash between the pivoting shaft and the through-hole of the parking pawl, it is uncertain which one of the corners first collides with the parking gear between the one end surface side and the other end surface side in the face width direction of the lock claw of the parking pawl. Therefore, the corner not provided with the retreated portion on the other end surface side of the tooth tip surface of the lock claw repeatedly collides (contacts) with the parking gear, which may cause chipping of the lock claw.

The present invention was conceived in view of the situations and it is therefore an object of the present invention to provide a parking lock mechanism suppressing chipping of a lock claw of a parking pawl even when the parking pawl repeatedly collides with a parking gear in the ratcheting running.

Solution to Problem

To achieve the above object, a first aspect of the present invention provides a parking lock mechanism comprising: a parking gear disposed on a power transmission member mechanically coupled to a drive wheel; and a parking pawl provided with a lock claw configured to mesh with the parking gear and switching between a lock state in which the lock claw is meshed with the parking gear and an unlock state in which meshing between the lock claw and the parking gear is released, wherein the lock claw includes a first end surface and a second end surface opposite to each other in a face width direction, wherein the lock claw includes a tooth tip surface provided with a retreated portion at a corner on the second end surface side, and wherein a position of a center of gravity of the parking pawl is on the second end surface side relative to a center plane in the face width direction of the lock claw.

A second aspect of the present invention provides the parking lock mechanism recited in the first aspect of the invention, wherein the parking pawl includes a first recessed portion disposed on the first end surface side.

A third aspect of the present invention provides the parking lock mechanism recited in the second aspect of the invention, wherein the first recessed portion is provided to extend from the first end surface to a lower surface on the side opposite to the tooth tip surface.

A fourth aspect of the present invention provides the parking lock mechanism recited in the second aspect of the invention, wherein the parking pawl includes a second recessed portion disposed on the second end surface side, and wherein a volume of a cavity of the first recessed portion is larger than a volume of a cavity of the second recessed portion.

A fifth aspect of the present invention provides the parking lock mechanism recited in any one of the first to fourth aspects of the invention, wherein the parking pawl is provided with a bent portion that is a portion of the parking pawl bent from the center plane in the face width direction of the lock claw toward the second end surface.

A sixth aspect of the present invention provides the parking lock mechanism recited in any one of the first to fifth aspects of the invention, wherein the parking pawl includes a protruding portion disposed on the second end surface side.

A seventh aspect of the present invention provides the parking lock mechanism recited in any one of the first to sixth aspects of the invention, wherein the parking pawl is molded by a punching process of a plate-shaped material, and wherein the retreated portion is a shear droop generated on the second end surface side.

An eighth aspect of the present invention provides the parking lock mechanism recited in any one of the first to sixth aspects of the invention, wherein the retreated portion is a chamfered portion.

Advantageous Effects of Invention

According to the parking lock mechanism recited in the first aspect of the invention, the lock claw has the first end surface and the second end surface opposite to each other in the face width direction, and the retreated portion is disposed at the corner on the second end surface side of the tooth tip surface of the lock claw. The position of the center of gravity of the parking pawl is on the second end surface side relative to the center plane in the face width direction of the lock claw. Therefore, the first end surface side is affected by the repelling force of the parking gear as compared to the second end surface side so that the lock claw is tilted around the position of the center of gravity of the parking pawl, and thus, the corner on the second end surface side provided with the retreated portion, which reduces the contact surface pressure at the time of collision of the parking pawl with the parking gear, collides with the parking gear earlier than the corner on the first end surface side. As a result, chipping of the lock claw of the parking pawl caused by repeated collision with the parking gear is suppressed.

According to the parking lock mechanism recited in the second aspect of the invention, the parking pawl has the first recessed portion disposed on the first end surface side. Since the first recessed portion is disposed, the inertia of the entire parking pawl decreases in addition to the suppression of chipping of the lock claw of the parking pawl, so that the input load of the parking pawl decreases at the time of collision with the parking gear.

According to the parking lock mechanism recited in the third aspect of the invention, the parking pawl has the first recessed portion provided to extend from the first end surface to the lower surface opposite to the tooth tip surface. Processing of the first recessed portion becomes easy so that a reduction in processing cost is achieved.

According to the parking lock mechanism recited in the fourth aspect of the invention, the parking pawl has the second recessed portion disposed on the second end surface side, and the volume of the cavity of the first recessed portion is larger than that of the second recessed portion. Since the second recessed portion is disposed, the inertia of the entire parking pawl further decreases, so that the input load of the parking pawl further decreases at the time of collision with the parking gear.

According to the parking lock mechanism recited in the fifth aspect of the invention, the parking pawl is provided with the bent portion that is a part of the parking pawl bent from the center plane in the face width direction of the lock claw toward the second end surface. The position of the center of gravity of the parking pawl can be located on the second end surface side relative to the center plane in the face width direction of the lock claw by an easily-performed bending process, so that a reduction in processing cost is achieved.

According to the parking lock mechanism recited in the sixth aspect of the invention, the parking pawl has the protruding portion disposed on the second end surface side. Therefore, the position of the center of gravity of the parking pawl can be located on the second end surface side relative to the center plane in the face width direction of the lock claw, so that the chipping of the lock claw of the parking pawl caused by repeated collision with the parking gear is suppressed.

According to the parking lock mechanism recited in the seventh aspect of the invention, the parking pawl is molded by the punching process of the plate-shaped material, and the retreated portion is the shear droop generated on the second end surface side. Since the shear droop generated at the time of the punching process is used as the retreated portion, the processing of the tooth tip surface of the lock claw can be omitted, so that a reduction in processing cost is achieved.

According to the parking lock mechanism recited in the eighth aspect of the invention, the retreated portion is the chamfered portion. Since the retreated portion is formed by the chamfering, a degree of freedom is improved in design of the shape of the retreated portion.

DESCRIPTION OF THE PREFERRED EMBODIMENTS

In this description, regarding a parking lock mechanism, a lock side refers to a side or direction toward a state in which a lock claw of a parking pawl is meshed with meshing teeth of a parking gear, and an unlock side refers to a side or direction toward a state in which the meshing is released between the lock claw of the parking pawl and the meshing teeth of the parking gear.

In this description, a lock state refers to a state in which the lock claw of the parking pawl is meshed with the meshing teeth of the parking gear in the parking lock mechanism, and an unlock state refers to a state in which the meshing is released between the lock claw of the parking pawl and the meshing teeth of the parking gear.

In this description, a meshing state refers to a state in which the lock claw of the parking pawl is meshed with the meshing teeth of the parking gear due to actuation of the parking lock mechanism to the lock side, and a non-meshing state refers to a state in which the lock claw of the parking pawl is not meshed with the meshing teeth of the parking gear even when the parking lock mechanism is actuated to the lock side. Therefore, the lock state and the meshing state of the parking lock mechanism have substantially the same meaning, while the unlock state and the non-meshing state of the parking lock mechanism have different meanings.

Examples of the present invention will now be described in detail with reference to the drawings. In the following examples, the figures are simplified or deformed as appropriate for facilitating understanding and portions are not necessarily precisely drawn in terms of dimension ratio, shape, etc.

First Example

Figure 1:
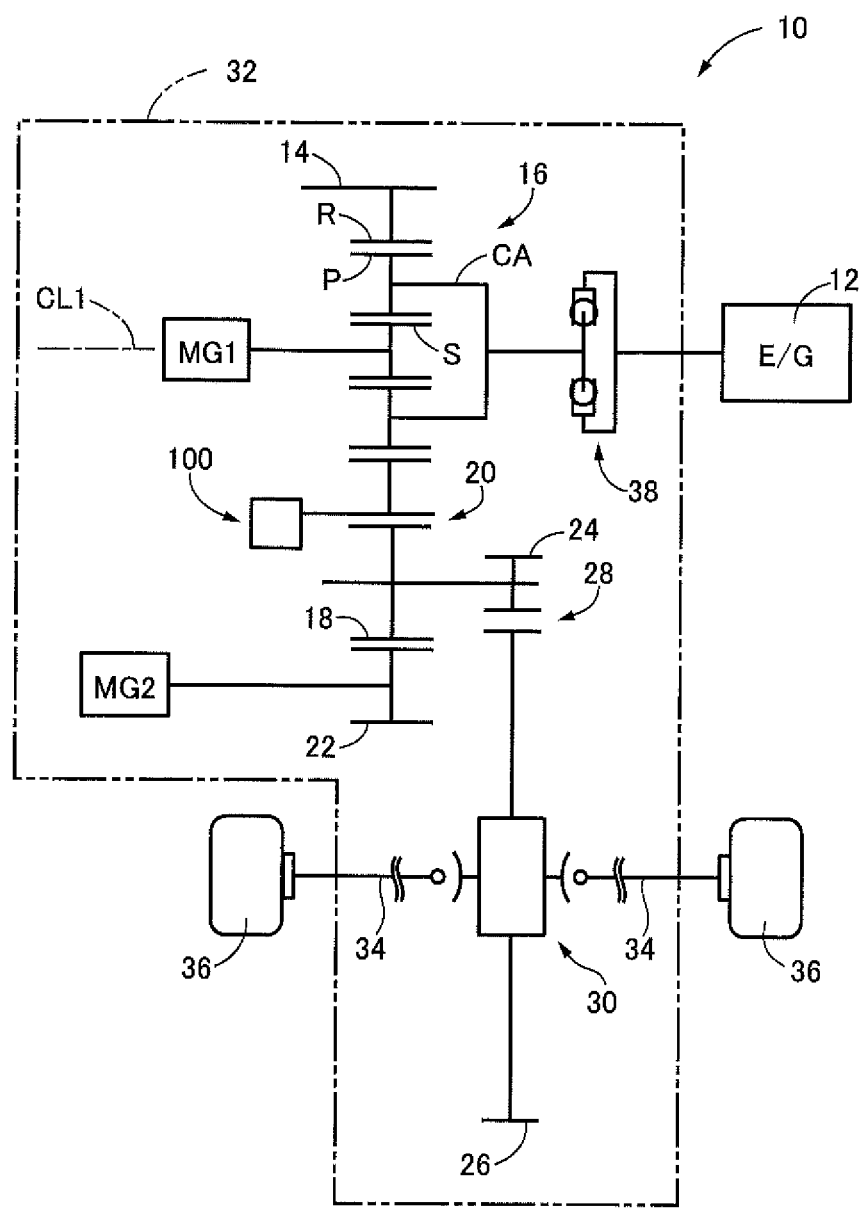
FIG. 1 is a skeleton diagram showing a schematic configuration of a hybrid vehicle on which a parking lock mechanism is mounted.

FIG. 1 is a skeleton diagram showing a schematic configuration of a hybrid vehicle 10 (hereinafter referred to as a vehicle 10) on which a parking lock mechanism 100 is mounted. The vehicle 10 includes an engine 12 as a drive power source for running and a power transmission device 32. The power transmission device 32 includes, for example, a power distribution mechanism 16 for distributing a power output from the engine 12 to a first electric motor MG1 and a counter drive gear 14 (hereinafter referred to as a drive gear 14), a counter gear pair 20 made up of the drive gear 14 and a counter driven gear 18 (hereinafter referred to as a driven gear 18) meshed with the drive gear 14, a second electric motor MG2 coupled to the driven gear 18 via a reduction gear 22 in a power transmittable manner, a final gear pair 28 made up of a differential drive gear 24 and a differential driven gear 26, a differential gear device 30 (final reduction gear), and a pair of left and right axles 34. The driven gear 18 and the differential drive gear 24 are configured to integrally rotate.

In the power transmission device 32, the power of the engine 12 is transmitted through the power distribution mechanism 16 and the drive gear 14 to the driven gear 18, while a power of the second electric motor MG2 is transmitted through the reduction gear 22 to the driven gear 18. And then, the power is transmitted from the driven gear 18 sequentially through the final gear pair 28, the differential gear device 30, and the pair of the left and right axles 34 to left and right drive wheels 36. A damper device 38 absorbing torque variations is interposed between the engine 12 and the power distribution mechanism 16.

The power distribution mechanism 16 is made up of a known single pinion type planetary gear device including as rotating elements a sun gear S, a pinion P, a carrier CA supporting the pinion P in a rotatable and revolvable manner, and a ring gear R meshed with the sun gear S via the pinion P. The sun gear S is coupled to the first electric motor MG1 in a power transmittable manner, the carrier CA is coupled to the engine 12 in a power transmittable manner, and the ring gear R is coupled to the drive gear 14 in a power transmittable manner. As a result, since the sun gear S, the carrier CA, and the ring gear R are made rotatable relative to each other, the power of the engine 12 is distributed to the first electric motor MG1 and the drive gear 14. The power distribution mechanism 16 is put into, for example, a continuously variable transmission state to function as an electrically controlled continuously variable transmission in which a rotation speed of the ring gear R coupled to the drive gear 14 is continuously varied regardless of a predetermined rotation of the engine 12. In other words, the power distribution mechanism 16 acts as an electrically controlled differential portion (electrically controlled continuously variable transmission portion) with a differential state of the power distribution mechanism 16 controlled by controlling an operating state of the first electric motor MG1 acting as a differential electric motor.

The parking lock mechanism 100 is disposed at a side of the drive gear 14. The parking lock mechanism 100 stops rotation of the drive gear 14 and thereby stops rotation of the drive wheels 36. Since the drive gear 14 is mechanically coupled to the drive wheels 36 via the counter gear pair 20, the final gear pair 28, the differential gear device 30, and the left and right axles 34, the rotation of the drive wheels 36 is stopped when the rotation of the drive gear 14 is stopped. The drive gear 14 corresponds to a "power transmission member" in the present invention. The power transmission member includes a shaft that is a rotating rod-shaped member, a gear, etc., and rotates to transmit power to the drive wheels 36.

Figure 2:
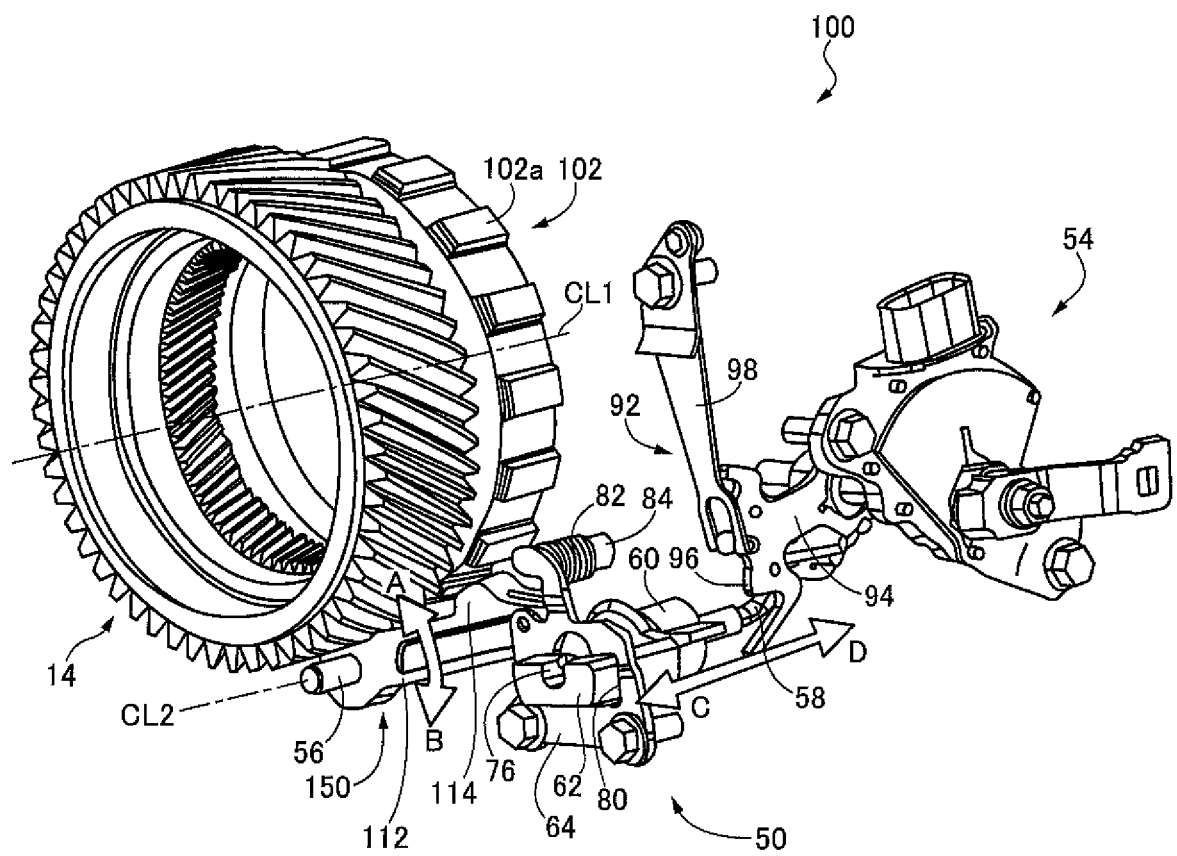
FIG. 2 is a view of an overall configuration of the parking lock mechanism of FIG. 1.

FIG. 2 is a view of an overall configuration of the parking lock mechanism 100 of FIG. 1. The parking lock mechanism 100 includes a parking gear 102 formed integrally with the drive gear 14, a parking pawl 150 provided with a lock claw 114 meshing with meshing teeth 102a of the parking gear 102, a cam mechanism 50 having a cam 52 (see FIG. 3B) in contact with the parking pawl 150 and moving the cam 52 parallel to a rotation axis CL1 of the parking gear 102 to pivot the parking pawl 150, and an actuator 54 driving the cam mechanism 50.

The parking gear 102 has a plurality of the meshing teeth 102a formed at equal angular intervals in the circumferential direction for meshing with the lock claw 114 of the parking pawl 150. When the meshing teeth 102a mesh with the lock claw 114, the rotation of each of the parking gear 102 and the drive gear 14 is stopped, and the rotation of the drive wheels 36 is also stopped.

The parking pawl 150 is a plate-shaped member including a bar-shaped portion 112 extending in the longitudinal direction and the lock claw 114 configured to mesh with the meshing teeth 102a. The parking pawl 150 is configured to be pivotable around a pivoting axis CL2 parallel to the rotation axis CL1, and when the parking pawl 150 pivots toward an arrow A shown in FIG. 2, the lock claw 114 and the meshing teeth 102a are meshed and the lock state is established, and when the parking pawl 150 pivots toward an arrow B shown in FIG. 2, the meshing between the lock claw 114 and the meshing teeth 102a is released and the unlock state is established. In this way, the parking pawl 150 is pivoted to implement a function of switching between the lock state in which the lock claw 114 is meshed with the meshing teeth 102a and the unlock state in which the meshing between the lock claw 114 and the meshing teeth 102a is released. A return spring 82 constantly urges the parking pawl 150 vertically downward, i.e., to the unlock side where the meshing is released between the lock claw 114 and the meshing teeth 102a; however, an urging force of a cam spring 68 described later is designed to be larger than the urging force of the return spring 82, so that the parking pawl 150 is pushed vertically upward against the urging force of the return spring 82.

Figure 3A:
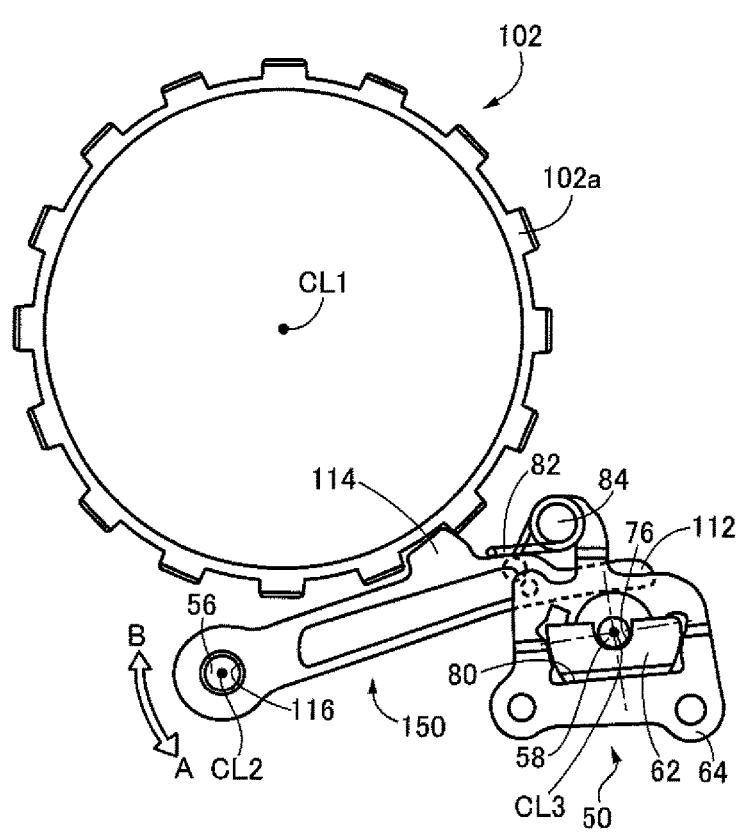
FIGS. 3A and 3B are views showing a meshing state in which a lock claw of the parking lock mechanism of FIG. 2 is meshed with meshing teeth of a parking gear.
Figure 3B:
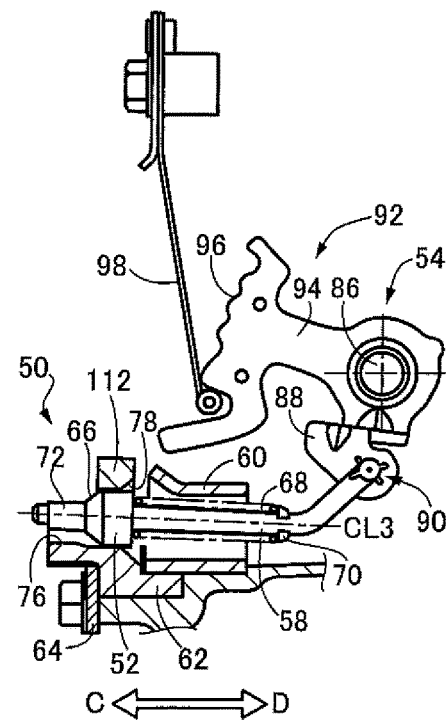

FIGS. 3A and 3B are vies showing the meshing state in which the lock claw 114 of the parking lock mechanism 100 of FIG. 2 is meshed with the meshing teeth 102a of the parking gear 102. FIG. 3A is a view of the parking gear 102, the parking pawl 150, and the cam mechanism 50 as viewed in the direction of the rotation axis CL1, and FIG. 3B is a view of the cam mechanism 50 (cross-sectional view) and the actuator 54 as viewed in the longitudinal direction in which the bar-shaped portion 112 extends. The upward direction of FIGS. 3A and 3B is the vertically upward direction of the vehicle 10.

The cam mechanism 50 includes the cam 52 in contact with the parking pawl 150, a parking rod 58 moving parallel to the rotation axis CL1 to move the cam 52 attached at the distal side of the parking rod 58, a cover 60 housing the parking rod 58, a parking sleeve 62 guiding the cam 52, a plate 64 holding the parking sleeve 62, and the cam spring 68 applying an urging force to the cam 52.

The cam 52 is an annular member provided with a conical tapered surface 66, and the parking rod 58 is inserted through the cam 52 such that the parking rod 58 is relatively movably in a direction of an axis CL3. The cam spring 68 is made up of a coil spring with the parking rod 58 penetrating therethrough. The cam spring 68 is interposed between a ring 70 immovably fixed to the parking rod 58 and the cam 52 to urge the cam 52 toward the leading end of the parking rod 58. The leading end of the parking rod 58 is provided with a large diameter portion 72 restricting the movement in the direction of the axis CL3 of the cam 52. Therefore, the cam 52 is urged toward the leading end of the parking rod 58 by the cam spring 68 and is brought into contact with the large diameter portion 72 formed on the leading end side of the parking rod 58 in a normal state as shown in FIG. 3B, when the parking lock mechanism 46 is switched to the meshing state.

The parking rod 58 is made movable via the actuator 54 in a direction C and a direction D (i.e., the direction of the axis CL3 of the parking rod 58) indicated by arrows of FIG. 3B. In FIG. 3B, the parking rod 58 is moved in the direction of the arrow C (i.e., toward the plate 64). The parking sleeve 62 is provided with a guide groove 76 guiding the cam 52 when the cam 52 is moved together with the parking rod 58. The cam 52 is moved along the guide groove 76.

A hole 80 through which the parking sleeve 62 penetrates is formed in the plate 64. A support shaft 84 supporting a return spring 82 is disposed on the plate 64. The return spring 82 is in contact with the parking pawl 150 and constantly urges the parking pawl 150 to the unlock side where the meshing is released between the lock claw 114 and the meshing teeth 102a. Therefore, when the parking lock mechanism 100 is switched from the lock state to the unlock state, the parking pawl 150 is promptly pivoted to the unlock side by the return spring 82.

The actuator 54 rotates a rotating shaft 86 to move the parking rod 58 in the direction of the axis CL3. The rotating shaft 86 is coupled via an intermediate member 88 to a shaft end portion of the parking rod 58 on the side opposite to the attachment position of the cam 52. Therefore, when the rotating shaft 86 rotates, a position of a coupling portion 90 connecting the intermediate member 88 and the parking rod 58 changes, and the parking rod 58 and the cam 52 move in the direction of the axis CL3 in accordance with the position of the connecting portion 90.

The rotating shaft 86 is provided with a detent mechanism 92. The detent mechanism 92 includes a detent plate 94 interlocking with the rotating shaft 86 and a detent spring 98 having a leading end portion pressed against a wavy surface 96 formed on the detent plate 94. The wavy surface 96 of the detent plate 94 has crests and troughs formed alternately and continuously. The leading end portion of the detent spring 98 is pressed against the wavy surface 96, and when the rotating shaft 86 reaches a rotation position corresponding to a predetermined shift position, the leading end portion of the detent spring 98 is moved on the wavy surface 96 to the position of the trough corresponding to the predetermined shift position.

The parking lock mechanism 100 is actuated, for example, when a P-lock switch not shown is pushed by a driver. When the P-lock switch is pushed and the rotating shaft 86 thereby rotates clockwise, the detent plate 94 is also pivoted clockwise around the rotating shaft 86. In this case, the leading end portion of the detent spring 98 is pressed against the trough formed at one end of the wavy surface 96 of the detent plate 94. The parking rod 58 moves in the direction of the arrow C of FIG. 3B, and the cam 52 disposed on the leading end side of the parking rod 58 is also moved in the direction of the arrow C in conjunction with the parking rod 58. In this case, the cam 52 moves along the guide groove 76 of the parking sleeve 62, so that the tapered surface 66 of the cam 52 moves while pushing aside a notch 78 formed in a leading end portion of the bar-shaped portion 112 of the parking pawl 150, and the parking pawl 150 is pushed upward. In other words, as the cam 52 moves in the direction of the arrow C, the parking pawl 150 is pivoted in the direction of the arrow A around a pivoting shaft 56. When the parking pawl 150 is pivoted in the direction of the arrow A, the lock claw 114 and the meshing teeth 102a are meshed into the meshing state, resulting in the lock state in which the rotation of the parking gear 102 is stopped.

If the P-lock switch is pushed by the driver while the vehicle 10 is running at a vehicle speed V (km/h) exceeding a predetermined meshing vehicle speed V1 (km/h), the lock claw 114 is repelled by the meshing teeth 102a, so that the meshing teeth 102a are not meshed with the lock claw 114. In this case, the parking pawl 150 is repelled by the meshing teeth 102a of the parking gear 102 while receiving a load from the cam spring 68 and the return spring 82 as the cam spring 68 and the return spring 82 expand and contract, so that the vehicle 10 enters a state of the ratcheting running in which in which the lock claw 114 repeatedly collides with the meshing teeth 102a.

The ratcheting running does not occur during running at the vehicle speed V equal to or less than the meshing vehicle speed V1, and when the meshing teeth 102a and the lock claw 114 mesh with each other, the parking lock mechanism 100 enters the lock state. The meshing vehicle speed V1 is decided in design based on the inertia in the pivoting direction of the parking pawl 150, the rigidity of the cam spring 68 and the return spring 82, etc. For example, when the inertia in the pivoting direction of the parking pawl 150 increases, the meshing vehicle speed V1 decreases.

Figure 4A:
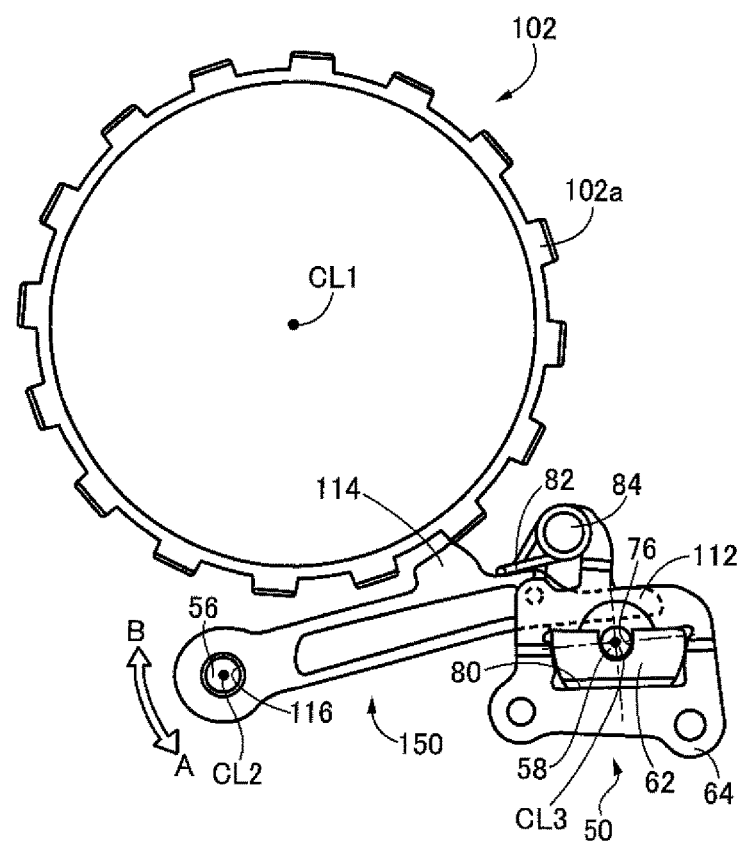
FIGS. 4A and 4B are views showing a non-meshing state in which the lock claw of the parking lock mechanism of FIG. 2 is not meshed with the meshing teeth of the parking gear in a state of ratcheting running.
Figure 4B:
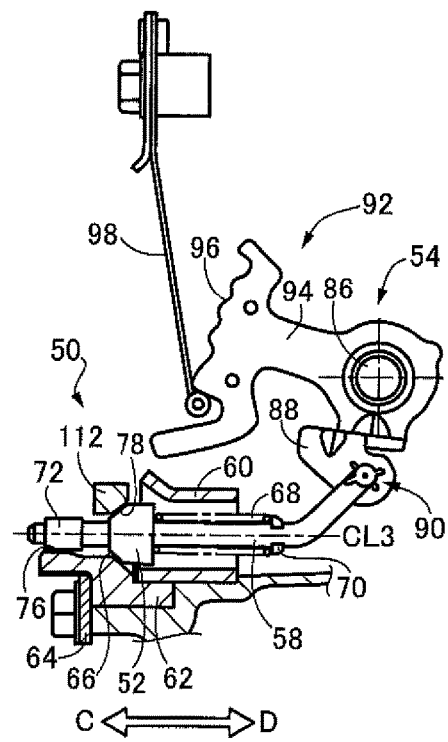

FIGS. 4A and 4B are a view showing the non-meshing state in which the lock claw 114 of the parking lock mechanism 100 of FIG. 2 is not meshed with the meshing teeth 102a of the parking gear 102 in a state of the ratcheting running. FIGS. 4A and 4B are views in the same directions as FIGS. 3A and 3B, respectively, and the upward direction of FIGS. 4A and 4B is the vertically upward direction of the vehicle 10.

As similar to in FIG. 3B, when the P-lock switch is pushed and the rotating shaft 86 thereby rotates clockwise, the detent plate 94 is also pivoted clockwise around the rotating shaft 86, and the parking rod 58 is moved in the direction of the arrow C of FIG. 4B (leftward). In the non-meshing state of the parking lock mechanism 100 shown in FIGS. 4A and 4B, a top portion of the lock claw 114 of the parking pawl 150 is repelled by a top portion of the meshing tooth 102a of the parking gear 102, so that the parking pawl 150 is prevented from pivoting. Accordingly, the cam 52 cannot push up the parking pawl 150 and move in the direction of the arrow C and is stopped at a position of contact between the tapered surface 66 of the cam 52 and the notch 78 of the parking pawl 150 as shown in FIG. 4B. In this case, the cam spring 68 contracts to allow the parking rod 58 to move in the direction of the axis CL3, which changes the relative positions between the cam 52 and the parking rod 58, so that the cam 52 is separated from the large diameter portion 72. Additionally, as the cam spring 68 contracts, an urging force is generated in a direction in which the cam 52 is moved toward the large diameter portion 72. Therefore, the cam mechanism 50 attempts to push vertically upward and pivot the parking pawl 150 toward the parking gear 102. Thus, during the ratcheting running, the parking pawl 150 is caused to pivot in a reciprocating manner around the pivoting shaft 56, and the lock claw 114 repeatedly collides with the meshing teeth 102a.

Figure 5:
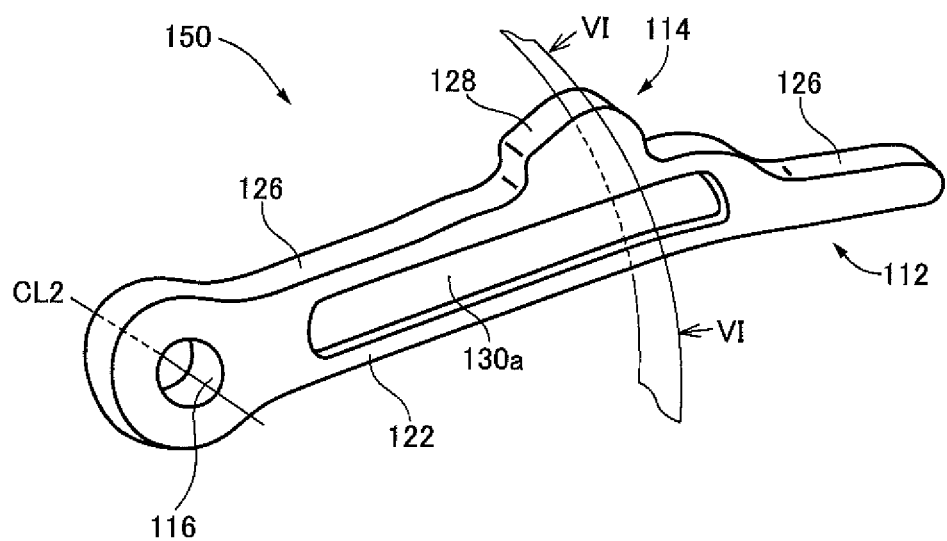
FIG. 5 is a perspective view of a parking pawl according to an example of the present invention.
Figure 6:
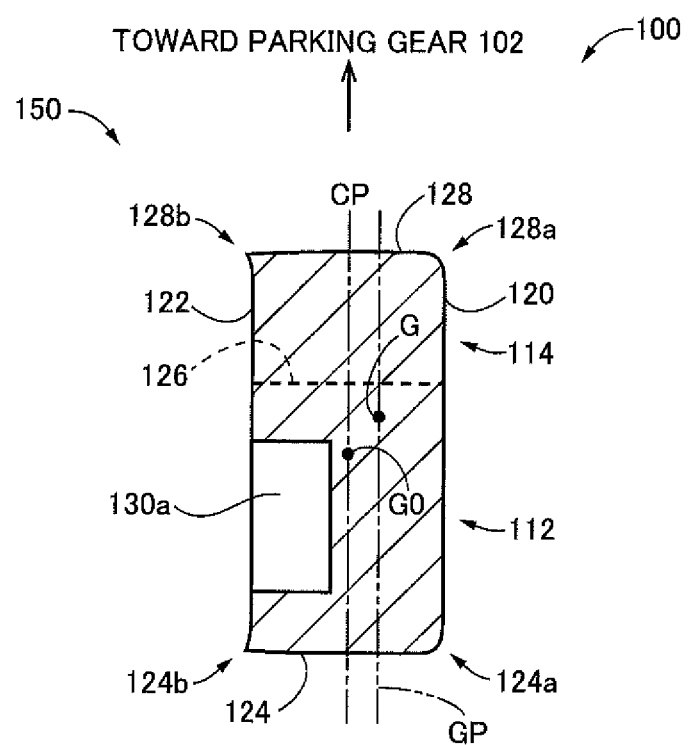
FIG. 6 is a cross sectional view of the parking pawl of FIG. 5.

FIG. 5 is a perspective view of the parking pawl 150 according to an example of the present invention and viewed from the side of a first end surface 122 described later. FIG. 6 is a cross sectional view of the parking pawl 150 of FIG. 5 and is a development view of a cylindrical cut surface having the pivoting axis CL2 as the central axis and passing through the top portion of the lock claw 114 of the parking pawl 150 as viewed from the outer circumference side i.e. along a direction indicated with arrows VI in FIG. 5. It is noted that cross sectional views of the parking pawls 250, 152, 154, 156, 158, 160 in the following examples are described in similar manner. The upward direction of FIG. 6 is the direction toward the parking gear 102.

The parking pawl 150 is manufactured by a punching process (shearing process), for example. The punching process is a process in which a shear stress is generated in a metal by using a metal mold such as a die or a punch to punch out a product from a plate-shaped material or punch a hole in a plate-shaped material by applying a load exceeding an elastic limit to the plate-shaped material. Specifically, a plate-shaped material having the first end surface 122 and a second end surface 120 opposite to each other is placed with the second end surface 120 on a die, and a pressure is applied by a punch from the first end surface 122 side to punch out the plate-shaped material from the first end surface 122 side toward the second end surface 120 side, so that the parking pawl 150 is molded. As a result of this punching process, the bar-shaped portion 112 and the lock claw 114 are formed in the parking pawl 150. A surface of the lock claw 114 facing the parking gear 102 is a tooth tip surface 128 (including the top portion); a surface of the bar-shaped portion 112 facing the parking gear 102 is a bar-shaped portion upper surface 126; and a surface of the bar-shaped portion 112 on the side opposite to the tooth tip surface 128 and the bar-shaped portion upper surface 126 is a bar-shaped portion lower surface 124. A face width direction of the lock claw 114 described later is a plate thickness direction of the plate-shaped material. Due to the punching process, a shear droop 128a and a shear droop 124a are formed at a corner on the second end surface 120 side of the tooth tip surface 128 and a corner on the second end surface 120 side of the bar-shaped portion lower surface 124, respectively. Although not shown, a shear droop is also formed at a corner on the second end surface 120 side of the bar-shaped portion upper surface 126. A burr 128b and a burr 124b are formed at a corner on the first end surface 122 side of the tooth tip surface 128 and a corner on the first end surface 122 side of the bar-shaped portion lower surface 124, respectively. Although not shown, a burr is also formed at a corner on the first end surface 122 side of the bar-shaped portion upper surface 126. The shear droops are portions deformed when a metal mold (in this example, a die) cuts into the plate-shaped material at the time of the punching process such that a curved surface is formed on one surface at an outer edge portion of the punched product, and the burrs are raised sharp-cornered portions left at the outer edge portion on the surface opposite to the surfaces having the shear droops at the time of the punching process. The corner on the second end surface 120 side provided with the shear droop 128a of the tooth tip surface 128 of the lock claw 114 is the top portion of the tooth tip surface 128 and is at a position first brought into contact with and repelled by the meshing teeth 102a of the parking gear 102 during the ratcheting running.

The bar-shaped portion lower surface 124 corresponds to a "lower surface" that is a surface on the side opposite to the tooth tip surface 128 in the present invention. The bar-shaped portion lower surface 124 simply means a surface on the side opposite to the tooth tip surface 128 and does not necessarily mean a surface on the lower side in the vertical direction. The shear droop 128a corresponds to the "retreated portion" in the present invention, and the retreated portion is a portion of the tooth tip surface 128 retreated toward the bar-shaped portion lower surface 124 as compared to a portion near a face width center plane CP described later at the corner on the second end surface 120 side of the tooth tip surface 128 of the lock claw 114.

A center plane of the face width with respect to the face width direction of the lock claw 114 is defined as the face width center plane CP. Specifically, the face width center plane CP is a plane parallel to the second end surface 120 and the first end surface 122 and equidistant from the second end surface 120 and the first end surface 122. A first recessed portion 130a is disposed on the first end surface 122 side opposite to the second end surface 120 side provided with the shear droop 128a of the tooth tip surface 128 of the lock claw 114. An opening portion of the first recessed portion 130a is on the first end surface 122, and a cavity (space) formed by the first recessed portion 130a is on the first end surface 122 side relative to the face width center plane CP. The first recessed portion 130a is formed by, for example, cutting, within a range in which the lock claw 114 and the bar-shaped portion 112 satisfy a required mechanical strength. A position G0 of the center of gravity of the parking pawl 150 before formation of the first recessed portion 130a is on the face width center plane CP. Strictly speaking, due to the shear droop 124a, the shear droop 128a, the burr 124b, and the burr 128b, the position G0 of the center of gravity of the parking pawl 150 is slightly on the first end surface 122 side relative to the face width center plane CP; however, in this description, since the influence thereof is extremely small, the position G0 of the center of gravity is regarded as being on the face width center plane CP. A position G of the center of gravity of the parking pawl 150 after formation of the first recessed portion 130a is on the second end surface 120 side relative to the face width center plane CP in the face width direction of the lock claw 114. Additionally, since the first recessed portion 130a has a larger volume of the cavity on the bar-shaped portion lower surface 124 side as compared to a volume of the cavity on the bar-shaped portion upper surface 126 side relative to the position G0 of the center of gravity, the position G of the center of gravity of the parking pawl 150 is located on the tooth tip surface 128 side relative to the position G0 of the center of gravity. Although the position G0 of the center of gravity and the position G of the center of gravity may not be on the development view of the cross section of FIG. 6, in such a case, the position G0 of the center of gravity and the position G of the center of gravity of the parking pawl 150 are displayed in the development view of the cross section of FIG. 6 as points projected in the longitudinal direction in which the bar-shaped portion 112 extends. In this description, the position G0 of the center of gravity and the position G of the center of gravity displayed in development views of cross sections in the drawings described later are points projected in the same way. The face width center plane CP corresponds to a "center plane" that is a plane at the center in the face width direction of the lock claw 114 in the present invention.

To make the parking pawl 150 pivotable around the pivoting shaft 56, the pivoting shaft 56 is inserted with a certain degree of clearance (backlash) in a through-hole 116 disposed in the parking pawl 150. Therefore, due to the collision with the meshing teeth 102a of the parking gear 102, the parking pawl 150 shakes around the position G of the center of gravity of the parking pawl 150 within a range allowed by the backlash between the pivoting shaft 56 and the through-hole 116 of the parking pawl 150.

Figure 7:
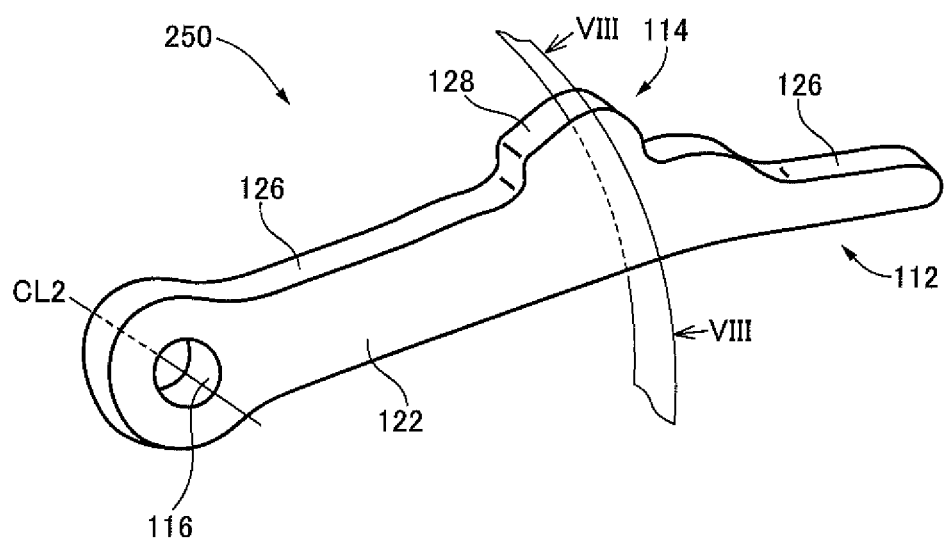
FIG. 7 is a perspective view of a parking pawl according to the comparative example.
Figure 8:
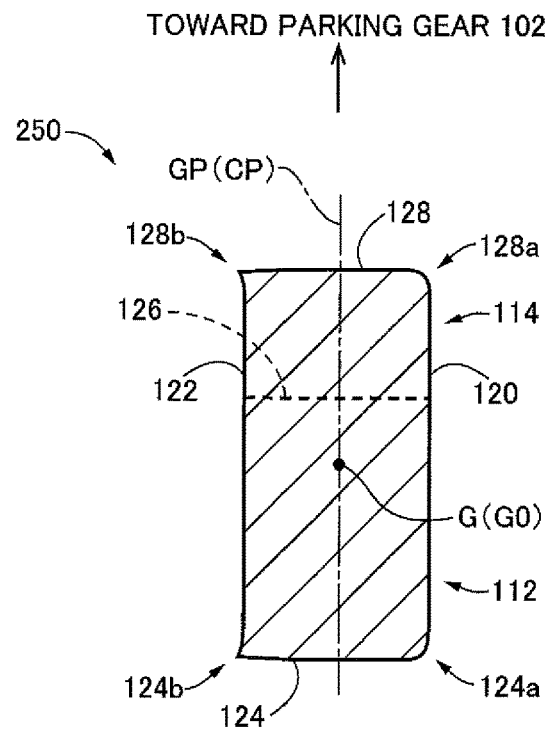
FIG. 8 is a development view of a cross section of the parking pawl of FIG. 7

Before describing a behavior of a parking pawl 150 during the ratcheting running of the first example, a behavior of a parking pawl 250 during the ratcheting running according to a comparative example will be described. FIG. 7 is a perspective view of the parking pawl 250 according to the comparative example. FIG. 8 is a development view of a cross section of the parking pawl 250 of FIG. 7 and is a development view of a cylindrical cut surface having the pivoting axis CL2 as the central axis and passing through the top portion of the lock claw 114 of the parking pawl 250 as viewed from the outer circumference side. The upward direction of FIG. 8 is the direction toward the parking gear 102.

The parking pawl 250 according to the comparative example has substantially the same structure as the parking pawl 150 of the first example and is different from the first example in that the first recessed portion 130a described above is not disposed. Therefore, the portions common to the first example are denoted by the same reference numerals and the description thereof will be omitted as appropriate.

Since the parking pawl 250 is not provided with the first recessed portion 130a, the position G of the center of gravity of the parking pawl 250 is the same as the position G0 of the center of gravity described above located on the face width center plane CP that is the center plane of the face width with respect to the face width direction of the lock claw 114. In this description, a plane passing through the position G of the center of gravity and parallel to the face width center plane CP is defined as a gravity center plane GP. For the parking pawl 250, the gravity center plane GP is the same as the face width center plane CP.

Figure 9:
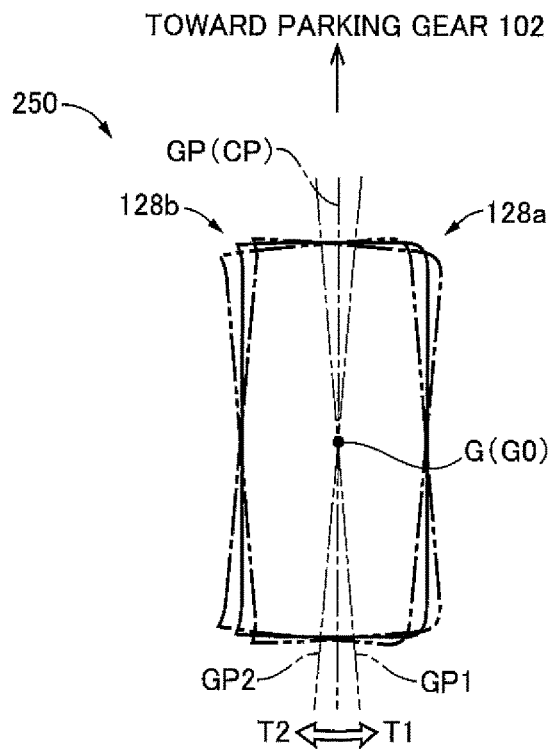
FIG. 9 is a view for explaining the behavior of the parking pawl of FIG. 8 during the ratcheting running.

FIG. 9 is a view for explaining the behavior of the parking pawl 250 of FIG. 8 during the ratcheting running. During the ratcheting running, the tooth tip surface 128 of the lock claw 114 is repelled to the top portion of each of the meshing teeth 102a of the parking gear 102. In this case, since the gravity center plane GP of the parking pawl 250 is the same as the face width center plane CP with respect to the face width direction of the lock claw 114, forces respectively applied from the meshing teeth 102a of the parking gear 102 to the second end surface 120 side and to the first end surface 122 side of the lock claw 114 relative to the gravity center plane GP act substantially the same. Therefore, the parking pawl 250 is repelled while being tilted around the position G of the center of gravity within the range allowed by the backlash between the pivoting shaft 56 and the through-hole 116 due to a slight difference between the forces respectively applied from the meshing teeth 102a to the second end surface 120 side and to the first end surface 122 side of the lock claw 114. The direction of the tilt is uncertain. Specifically, it is uncertain whether the gravity center plane GP of the parking pawl 250 has a tilting direction T1 as indicated by a gravity center plane GP1 or a tilting direction T2 as indicated by a gravity center plane GP2, and therefore, it is uncertain which one of the corners collides with the parking gear 102 between the second end surface 120 side and the first end surface 122 side in the face width direction of the lock claw 114 at the time of re-collision after the lock claw 114 is repelled. Since the shear droop 128a is formed at the corner on the second end surface 120 side of the tooth tip surface 128 of the lock claw 114, the contact surface pressure is reduced at the time of collision with the parking gear 102; however, no shear droop is formed at the corner on the first end surface 122 side of the tooth tip surface 128 of the lock claw 114, so that the contact surface pressure is not reduced at the time of collision with the parking gear 102. Therefore, when the lock claw 114 is tilted in the direction of the tilting direction T2 and the corner on the first end surface 122 side of the tooth tip surface 128 of the lock claw 114 repeatedly collides with the parking gear 102, the lock claw 114 may be chipped.

The behavior of the parking pawl 150 of the first example during the ratcheting running will hereinafter be described.

Figure 10:
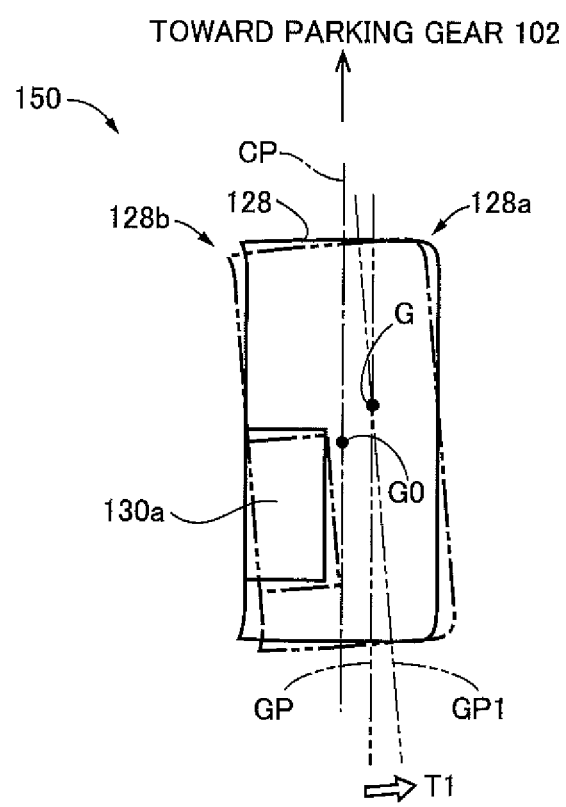
FIG. 10 is a view for explaining the behavior of the parking pawl of FIG. 6 during the ratcheting running.

FIG. 10 is a view for explaining the behavior of the parking pawl 150 of FIG. 6 during the ratcheting running. During the ratcheting running, the tooth tip surface 128 of the lock claw 114 is repelled to the top portion of each of the meshing teeth 102a of the parking gear 102. Since repelling force from the meshing teeth 102a of the parking gear applies on the tooth tip surface in the face width direction of the lock claw 114 and the position G of the center of gravity of the parking pawl 150 is on the second end surface 120 side relative to the face width center plane CP with respect to the face width direction of the lock claw 114, a larger component of the force is applied to the first end surface 122 side relative to the gravity center plane CP than the second end surface 120 side. Therefore, the parking pawl 150 is tilted in the direction shown as the tilting direction T1 indicated by an arrow around the position G of the center of gravity within the range allowed by the backlash between the pivoting shaft 56 and the through-hole 116 of the parking pawl 150. In other words, the parking pawl 150 is repelled while the gravity center plane GP is tilted in the direction of the tilting direction T1 as indicated by the gravity center plane GP1. Since the tilting direction of the parking pawl 150 is decided as indicated by the tilting direction T1 in this way, the corner on the second end surface 120 side in the face width direction of the lock claw 114 collides with the parking gear 102 at the time of re-collision after the lock claw 114 is repelled. Since the shear droop 128a is formed at the corner on the second end surface 120 side of the tooth tip surface 128 of the lock claw 114, the contact surface pressure is reduced at the time of collision with the parking gear 102, and the lock claw 114 is less likely to be chipped even when repeatedly colliding with the parking gear 102 during the ratcheting running.

According to the parking lock mechanism 100 of this example, the lock claw 114 disposed on the parking pawl 150 has the second end surface 120 and the first end surface 122 opposite to each other in the face width direction, and the shear droop 128*a* is disposed as the retreated portion at the corner on the second end surface 120 side of the tooth tip surface 128 of the lock claw 114. The position G of the center of gravity of the parking pawl 150 is on the second end surface 120 side relative to the face width center plane CP in the face width direction of the lock claw 114. Therefore, the first end surface 122 side is affected by the repelling force of the parking gear 102 as compared to the second end surface 120 side so that the lock claw 114 is tilted around the position G of the center of gravity of the parking pawl 150, and thus, the corner on the second end surface 120 side provided with the shear droop 128*a* collides with the parking gear 102 earlier than the corner on the first end surface 122 side. As a result, chipping of the lock claw 114 caused by repeated collision with the parking gear 102 is suppressed. When the lock claw 114 is repelled by the parking gear 102, an inertia acts around the position G of the center of gravity of the parking pawl 150 so that the parking pawl 150 is tilted around the position G of the center of gravity.

According to the parking lock mechanism 100 of this example, the parking pawl 150 has the first recessed portion 130*a* disposed on the first end surface 122 side. Since the first recessed portion 130*a* is disposed, the inertia of the entire parking pawl 150 decreases in addition to the suppression of chipping of the lock claw 114 of the parking pawl 150, so that the input load of the parking pawl 150 decreases at the time of collision with the parking gear 102, which reduces a surface pressure applied from the parking gear 102 to the lock claw 114 of the parking pawl 150. The inertia of the entire parking pawl 150 refers to at least one of an inertia at the time of pivoting of the parking pawl 150 around the pivoting shaft 56 and an inertia at the time of tilting of the parking pawl 150 around the position G of the center of gravity.

According to the parking lock mechanism 100 of this example, since the parking pawl 150 is molded by the punching process and the shear droop 128*a* formed at the time of the punching process is used as the retreated portion, the processing of the tooth tip surface 128 of the lock claw 114 can be omitted, so that a reduction in processing cost is achieved.

Second Example

Figure 11:
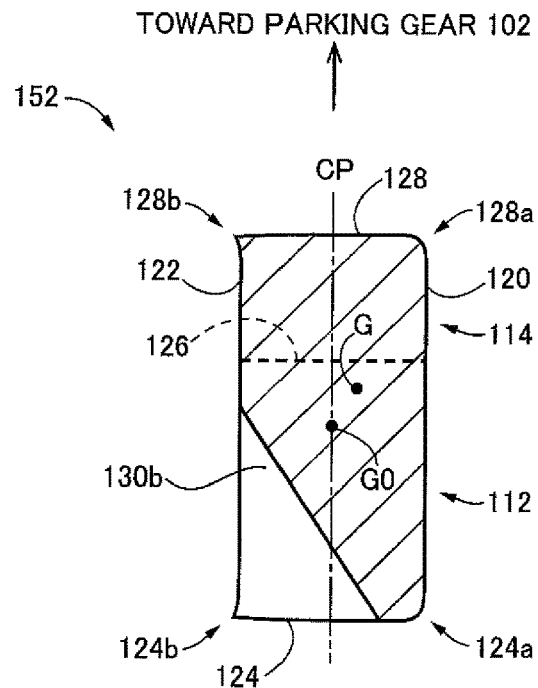
FIG. 11 is a development view of a cross section of a parking pawl according to another example of the present invention.

FIG. 11 is a development view of a cross section of a parking pawl 152 according to another example of the present invention, corresponding to FIG. 6 in the first example. Although the structure of the parking pawl 152 is substantially the same as the structure of the parking pawl 150 according to the first example, a first recessed portion 130*b* disposed on the parking pawl 152 has a shape different from the shape of the first recessed portion 130*a* disposed on the parking pawl 150 of the first example. Therefore, different portions will mainly be described, while the portions common to the first example are denoted by the same reference numerals and the description thereof will be omitted as appropriate.

The first recessed portion 130*b* is disposed on the first end surface 122 side opposite to the second end surface 120 side having the shear droop 128*a* formed on the tooth tip surface 128 of the lock claw 114 of the parking pawl 152. The first recessed portion 130*b* is disposed to extend from the first end surface 122 to the bar-shaped portion lower surface 124 opposite to the tooth tip surface 128. Specifically, the first recessed portion 130*b* has a surface inclined relative to the face width center plane CP. The first recessed portion 130*b* is formed by cutting, for example. Although the first recessed portion 130*b* is located on both the first end surface 122 side and the second end surface 120 side relative to the face width center plane CP, a larger portion of the space of the first recessed portion 130*b* is located on the first end surface 122 side relative to the face width center plane CP, and the remaining portion thereof is located on the second end surface 120 side. The volume of the space on the first end surface 122 side relative to the center plane CP of the first recessed portion 130*b* is larger than the volume of the space on the second end surface 120 side relative to the center plane CP. Therefore, although the position G0 of the center of gravity of the parking pawl 152 before formation of the first recessed portion 130*b* is on the face width center plane CP, the position G of the center of gravity of the parking pawl 152 after formation of the first recessed portion 130*b* is on the second end surface 120 side relative to the face width center plane CP in the face width direction of the lock claw 114. Additionally, since the first recessed portion 130*b* is provided with a space on the bar-shaped portion lower surface 124 side, the position G of the center of gravity of the parking pawl 152 is on the tooth tip surface 128 side relative to the position G0 of the center of gravity. Although the space formed by the first recessed portion 130*b* is on both the first end surface 122 side and the second end surface 120 side relative to the center plane CP in this example, the space formed by the first recessed portion 130*b* may be only on the first end surface 122 side relative to the center plane CP.

According to the parking lock mechanism 100 of the example, the parking pawl 152 has the first recessed portion 130*b* that is a recessed portion disposed to extend from the first end surface 122 to the bar-shaped portion lower surface 124 opposite to the tooth tip surface 128. For example, if the first recessed portion 130*b* is formed by cutting, the shape of the cutting surface is simpler than the first recessed portion 130*a* of the first example, and therefore, processing becomes easy so that a reduction in processing cost is achieved.

Third Example

Figure 12:
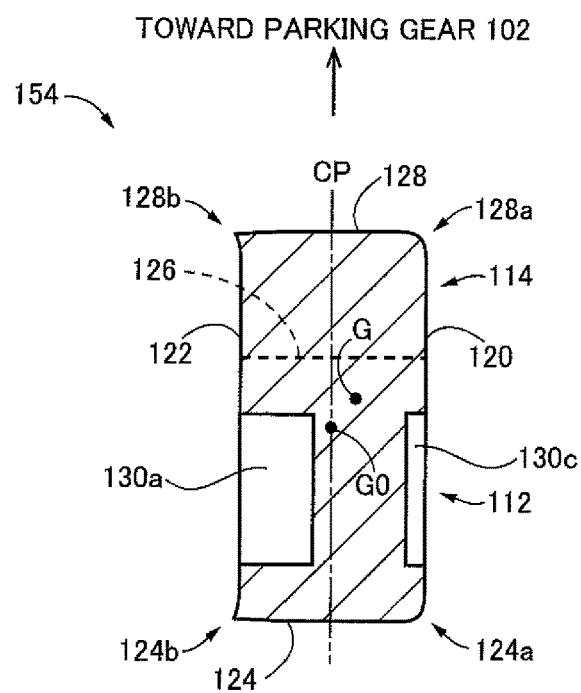
FIG. 12 is a development view of a cross section of a parking pawl according to still another example of the present invention.

FIG. 12 is a development view of a cross section of a parking pawl 154 according to another example of the present invention, corresponding to FIG. 6 in the first example. The structure of the parking pawl 154 is substantially the same as that of the parking pawl 150 according to the first example and is different from the first example in that a second recessed portion 130*c* is disposed in addition to the first recessed portion 130*a*. Therefore, different portions will mainly be described, while the portions common to the first example are denoted by the same reference numerals and the description thereof will be omitted as appropriate.

The second recessed portion 130*c* is disposed on the second end surface 120 side having the shear droop 128*a* formed on the tooth tip surface 128 of the lock claw 114 of the parking pawl 154. Therefore, an opening portion of the second recessed portion 130*c* is on the second end surface 120, and a cavity (space) formed by the second recessed portion 130*c* is on the second end surface 120 side relative to the face width center plane CP. The volume of the cavity of the first recessed portion 130*a* disposed on the first end surface 122 side is larger than the volume of the cavity of the second recessed portion 130*c* disposed on the second end surface 120 side. Therefore, although the position G0 of the center of gravity of the parking pawl 154 before formation of the first recessed portion 130*b* and the second recessed portion 130c is on the face width center plane CP, the position G of the center of gravity of the parking pawl 154 after formation of the first recessed portion 130b and the second recessed portion 130c is on the second end surface 120 side relative to the face width center plane CP in the face width direction of the lock claw 114.

According to the parking lock mechanism 100 of this example, the parking pawl 154 has the first recessed portion 130a disposed on the first end surface 122 side and the second recessed portion 130c disposed on the second end surface 120 side, and the volume of the cavity of the first recessed portion 130a is larger than the volume of the cavity of the second recessed portion 130c. Therefore, the position G of the center of gravity of the parking pawl 154 is on the second end surface 120 side provided with the shear droop 128a relative to the face width center plane CP in the face width direction of the lock claw 114 as in the first example, so that the chipping of the lock claw 114 caused by repeated collision with the parking gear 102 is suppressed. Additionally, since the second recessed portion 130c is disposed, the inertia of the entire parking pawl 154 further decreases as compared to the first example, so that the input load of the parking pawl 154 further decreases at the time of collision with the parking gear 102.

Fourth Example

Figure 13:
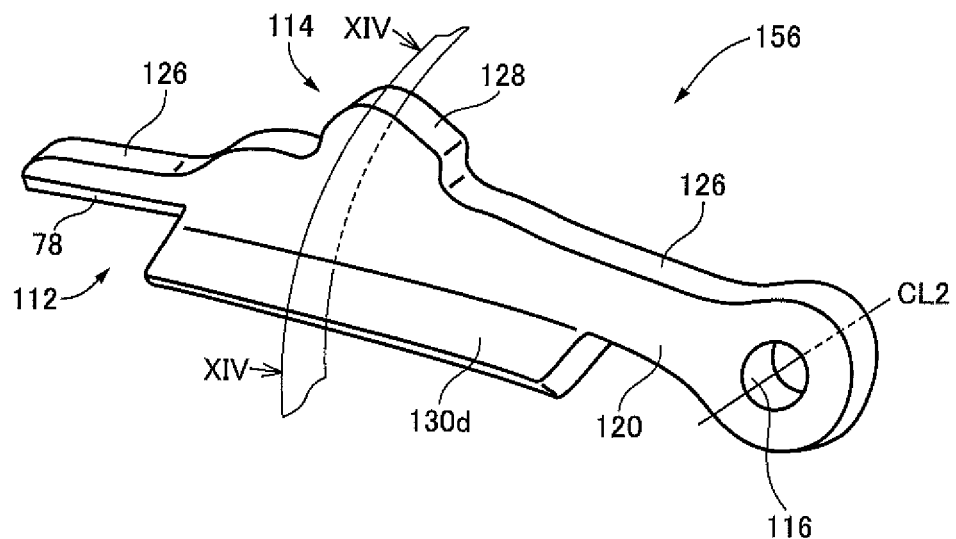
FIG. 13 is a perspective view of a parking pawl according to still another example of the present invention.
Figure 14:
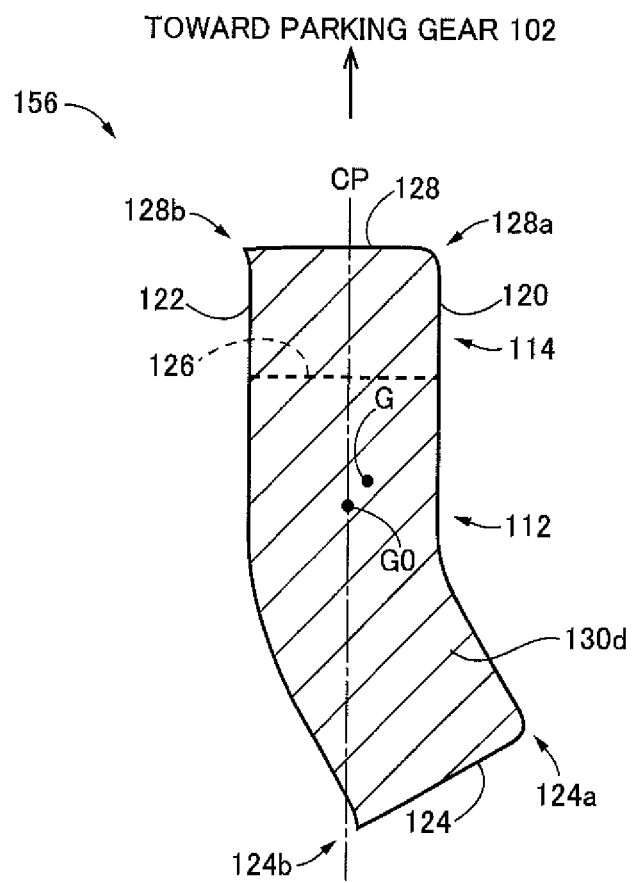
FIG. 14 is a development view of a cross section of the parking pawl of FIG. 13.

FIG. 13 is a perspective view of a parking pawl 156 according to another example of the present invention as viewed from the second end surface 120 side. FIG. 14 is a development view of a cross section of the parking pawl 156 to FIG. 13, corresponding to FIG. 6 in the first example. The structure of the parking pawl 156 is substantially the same as the structure of the parking pawl 150 according to the first example and is different from the first example in that the first recessed portion 130a disposed in the first example is not disposed and that a bent portion 130d is disposed instead. Therefore, different portions will mainly be described, while the portions common to the first example are denoted by the same reference numerals and the description thereof will be omitted as appropriate.

The parking pawl 156 is provided with the bent portion 130d that is a part of the bar-shaped portion 112 extending downwardly and bent from the face width center plane CP of the lock claw 114 toward the second end surface 120 on the bar-shaped portion lower surface 124 side of the bar-shaped portion 112. Although the position G0 of the center of gravity of the parking pawl 156 before formation of the bent portion 130d is on the face width center plane CP, the position G of the center of gravity of the parking pawl 156 after formation of the bent portion 130d is on the second end surface 120 side relative to the face width center plane CP in the face width direction of the lock claw 114.

According to the parking lock mechanism 100 of this example, the parking pawl 156 is provided with the bent portion 130d that is a part of the bar-shaped portion 112 of the parking pawl 156 bent from the face width center plane CP of the lock claw 114 toward the second end surface 120. The position G of the center of gravity of the parking pawl 156 can be located on the second end surface 120 side relative to the face width center plane CP of the lock claw 114 by an easily-performed bending process, so that a reduction in processing cost is achieved.

Fifth Example

Figure 15:
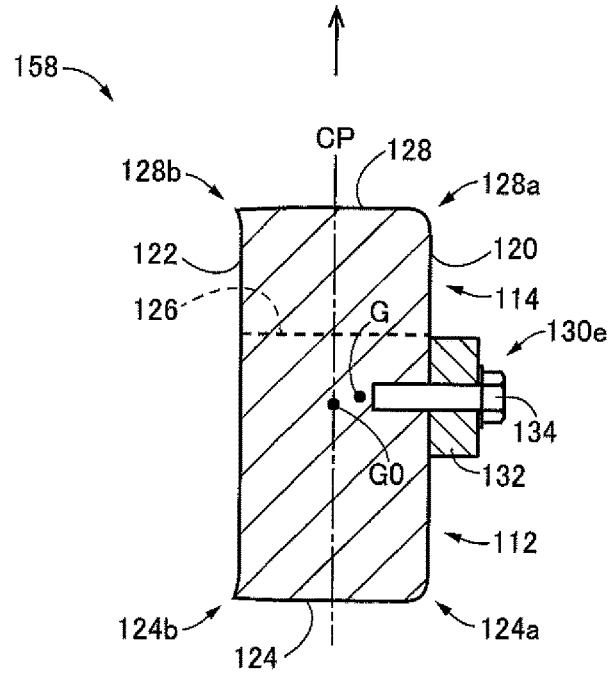
FIG. 15 is a development view of a cross section of a parking pawl according to still another example of the present invention.

FIG. 15 is a development view of a cross section of a parking pawl 158 according to another example of the present invention, corresponding to FIG. 6 in the first example. The structure of the parking pawl 158 is substantially the same as the structure of the parking pawl 150 according to the first example and is different from the first example in that the first recessed portion 130a disposed in the first example is not disposed and that a protruding portion 130e is disposed instead. Therefore, different portions will mainly be described, while the portions common to the first example are denoted by the same reference numerals and the description thereof will be omitted as appropriate.

The protruding portion 130e is disposed on the second end surface 120 side having the shear droop 128a formed on the tooth tip surface 128 of the lock claw 114. The protruding portion 130e includes a weight 132 and a bolt 134. The weight 132 is coupled and fixed to the second end surface 120 of the bar-shaped portion 112 of the parking pawl 158 with the bolt 134 such that the bolt 134 is inserted through a through-hole disposed in the weight 132 and fastened to a hole disposed on the second end surface 120, thereby functioning as the protruding portion 130e of the parking pawl 158. The bolt 134 also functions as a weight. Although the position G0 of the center of gravity of the parking pawl 158 before formation of the protruding portion 130e is on the face width center plane CP, the position G of the center of gravity of the parking pawl 158 after formation of the protruding portion 130e is on the second end surface 120 side relative to the face width center plane CP in the face width direction of the lock claw 114 due to the weight of the protruding portion 130e.

According to the parking lock mechanism 100 of this example, the parking pawl 158 has the protruding portion 130e disposed on the second end surface 120 side. Therefore, the position G of the center of gravity of the parking pawl 158 is on the second end surface 120 side provided with the shear droop 128a relative to the face width center plane CP in the face width direction of the lock claw 114 as in the first example, so that the chipping of the lock claw 114 caused by repeated collision with the parking gear 102 is suppressed.

Sixth Example

Figure 16:
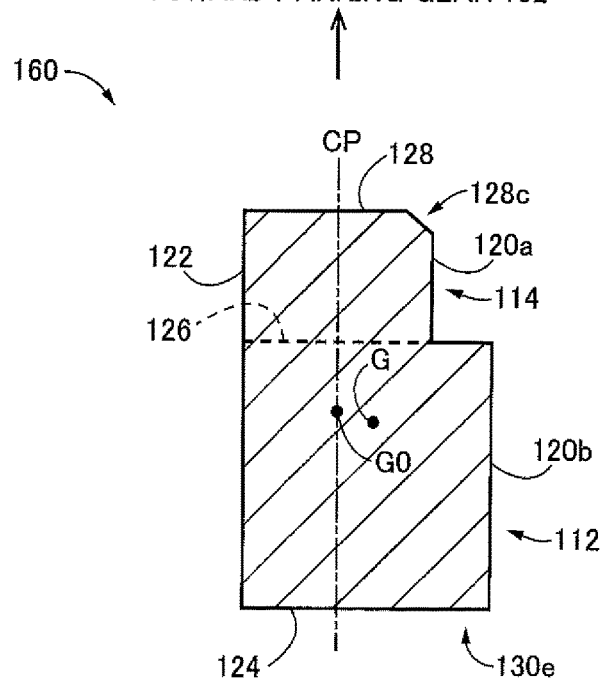
FIG. 16 is a development view of a cross section of a parking pawl according to still another example of the present invention.

FIG. 16 is a development view of a cross section of a parking pawl 160 according to another example of the present invention, corresponding to FIG. 6 in the first example. The structure of the parking pawl 160 is substantially the same as the structure of the parking pawl 150 according to the first example and is different from the first example in that the first recessed portion 130a disposed in the first example is not disposed and that a second end surface 120a of surfaces 120a, 122 opposite to each other in the face width direction of the lock claw 114 has a shape retreated toward the face width center plane CP instead. Therefore, different portions will mainly be described, while the portions common to the first example are denoted by the same reference numerals and the description thereof will be omitted as appropriate.

The parking pawl 160 is not molded by the punching process and is manufactured by casting. As described above, the second end surface 120a in the face width direction of the lock claw 114 has a shape retreated toward the face width center plane CP as compared to a second end surface 120b in the face width direction of the bar-shaped portion 112. The lock claw 114 has the second end surface 120a and the first end surface 122 opposite to each other in the face width direction, and the bar-shaped portion 112 has the second end surface 120b and the first end surface 122 described above opposite to each other in the face width direction. On a corner on the second end surface 120a side of the tooth tip surface 128, a chamfered portion 128c functioning as a retreated portion is disposed by a chamfering. The chamfering refers to making a sloped or rounded portion at a corner formed by surfaces intersecting each other, and in this example, a sloped portion is made at the corner formed by the tooth tip surface 128 and the second end surface 120a intersecting each other. Since a portion between the second end surface 120a and the second end surface 120b in the face width direction of the bar-shaped portion 112 serves as the protruding portion 130e as in the fifth example, the position G of the center of gravity of the parking pawl 160 is on the second end surface 120a side relative to the face width center plane CP in the face width direction of the lock claw 114. The chamfered portion 128c corresponds to the "retreated portion" in the present invention.

According to the parking lock mechanism 100 of this example, the parking pawl 160 has the portion between the second end surface 120a and the second end surface 120b in the face width direction of the bar-shaped portion 112 serving as the protruding portion 130e. Therefore, the position G of the center of gravity of the parking pawl 160 is on the second end surface 120a side provided with the chamfered portion 128c relative to the face width center plane CP in the face width direction of the lock claw 114. As with the shear droop 128a, the chamfered portion 128c reduces the contact surface pressure at the time of collision with the parking gear 102. Therefore, the chipping of the lock claw 114 caused by repeated collision with the parking gear 102 is suppressed.

According to the parking lock mechanism 100 of this example, the chamfered portion 128c chamfered during casting is disposed at the corner on the second end surface 120a side of the tooth tip surface 128 of the lock claw 114. Since the chamfered portion 128c is formed by the chamfering, a degree of freedom is improved in design of the shape of the chamfered portion 128c, and the chamfered portion 128c can be formed into a preferable shape depending on shapes etc. of the meshing teeth 102a of the parking gear 102 and the lock claw 114.

Although the example of the present invention has been described in detail with reference to the drawings, the present invention is also applicable in other forms.

In the first to fifth examples, the parking pawls 150, 152, 154, 156, 158 are formed by the punching process of a plate-shaped material, and in the sixth example, the cast parking pawl 160 is used; however, the present invention is not limited thereto. For example, a parking pawl may be manufactured by cutting a plate-shaped material.

In the first to fifth examples, the shear droop 128a formed at the time of the punching process is the retreated portion, and in the sixth example, the chamfered portion 128c formed by the casting is the retreated portion; however, the present invention is not limited thereto. For example, the chamfered portion 128c may be formed as the retreated portion by a chamfering by cutting. Since the shear droop 128a formed at the time of the punching process has a small degree of freedom in design of the shape, the chamfering by cutting may be added to a position where the shear droop 128a is formed, or the chamfering by cutting may be performed at a position where the burr 128b is formed. If the tooth tip surface 128 of the lock claw 114 has different shapes at corners on both end surface sides 120, 122 in the face width direction, the retreated portion can be defined as the corner retreated in a larger amount toward the bar-shaped portion lower surface 124. The shape of the chamfered portion 128c may be any of curved surface shapes including tapered shapes and R-shapes.

In the fifth example, the protruding portion 130e has the weight 132 coupled and fixed by the bolt 134 to the bar-shaped portion 112 of the parking pawl 158; however, the present invention is not limited thereto. For example, the weight 132 may be coupled and fixed by other methods such as welding to the bar-shaped portion 112 of the parking pawl 158, in such a case, the bolt 134 is not necessarily required.

In the first to third examples, the first recessed portion 130a is disposed in the first end surface 122 or the first recessed portion 130b is disposed to extend from the first end surface 122 to the bar-shaped portion lower surface 124; however, the present invention is not limited thereto. For example, recessed portions may be disposed in the bar-shaped portion upper surface 126 and/or the bar-shaped portion lower surface 124 within a range in which the lock claw 114 and the bar-shaped portion 112 of the parking pawl 150, 152, 154 satisfy a required mechanical strength, and the recessed portions may have the volume of the space on the first end surface 122 side relative to the face width center plane CP of the lock claw 114 made larger than the volume of the space on the second end surface 120 side relative to the face width center plane CP, so that the position G of the center of gravity of the parking pawl 150, 152, 154 is located on the second end surface 120 side relative to the face width center plane CP.

In the first to sixth examples, only one of the first recessed portion 130a, the first recessed portion 130b, the bent portion 130d, and the protruding portion 130e is disposed to locate the position G of the center of gravity of the parking pawl 150, 152, 154, 156, 158, 160 on the second end surface 120 side relative to the face width center plane CP in the face width direction of the lock claw 114; however, the present invention is not limited thereto. For example, more than one of the first recessed portion 130a, the first recessed portion 130b, the bent portion 130d, and the protruding portion 130e may be disposed in combination. The first recessed portions 130a, 130b, the second recessed portion 130c, the bent portion 130d, and the protruding portion 130e can be formed by using various methods such as cutting, press working (e.g., bending, drawing, and compressing), and casting.

In the first to sixth examples, the power transmission member is the counter drive gear 14; however, the present invention is not limited thereto. For example, the power transmission member may be a member mechanically coupled to the drive wheels 36 and rotating to transmit power to the drive wheels 36, such as the counter driven gear 18, the reduction gear 22, the differential drive gear 24, and the differential driven gear 26, is not limited to a gear, and may be a shaft.

In the first to sixth examples, the present invention is applied to the hybrid vehicle 10; however, the present invention is not limited thereto. For example, the present invention may be applied to a vehicle in which power driving the vehicle may be generated only by an engine that is an internal combustion engine or may be applied to an electric vehicle in which the power is generated by only an electric motor from an electric energy. In short, the present invention is applicable to any vehicles including the parking lock mechanism 100.

The above description is merely examples of the present invention and the present invention can be implemented in variously modified and improved forms based on the knowledge of those skilled in the art without departing from the spirit thereof.

REFERENCE SIGNS LIST

14: counter drive gear (power transmission member)
36: drive wheels
100: parking lock mechanism
102: parking gear
114: lock pawl
120: second end surface
122: first end surface
124: bar-shaped portion lower surface (lower surface)
128: tooth tip surface
128*a*: shear droop (retreated portion)
128*c*: chamfered portion (retreated portion)
130*a*, 130*b*: first recessed portion
130*c*: second recessed portion
130*d*: bent portion
130*e*: protruding portion
150, 152, 154, 156, 158, 160: parking pawl
CP: face width center plane (center plane)
G: position of center of gravity of the parking pawl

What is claimed is:

1. A parking lock mechanism comprising: a parking gear disposed on a power transmission member mechanically coupled to a drive wheel; and a parking pawl provided with a lock claw configured to mesh with the parking gear and switching between a lock state in which the lock claw is meshed with the parking gear and an unlock state in which meshing between the lock claw and the parking gear is released, wherein
the lock claw includes a first end surface and a second end surface opposite to each other in a face width direction, wherein
the lock claw includes a tooth tip surface extending between a first corner on the first end surface side and a second corner on the second end surface side, the tooth tip surface being provided with a retreated portion only at the second corner on the second end surface side, and wherein
a position of a center of gravity of the parking pawl is on the second end surface side relative to a center plane in the face width direction of the lock claw.

2. The parking lock mechanism according to claim 1, wherein
the parking pawl includes a first recessed potion disposed on the first end surface side.

3. The parking lock mechanism according to claim 2, wherein
the first recessed potion is provided to extend from the first end surface to a lower surface on a side opposite to the tooth tip surface.

4. The parking lock mechanism according to claim 2, wherein
the parking pawl includes a second recessed portion disposed on the second end surface side, and wherein
a volume of a cavity of the first recessed portion is larger than a volume of a cavity of the second recessed portion.

5. The parking lock mechanism according to claim 1, wherein
the parking pawl is provided with a bent portion that is a portion of the parking pawl bent from the center plane in the face width direction of the lock claw toward the second end surface.

6. The parking lock mechanism according to claim 1, wherein
the parking pawl includes a protruding portion disposed on the second end surface side.

7. The parking lock mechanism according to claim 1, wherein
the parking pawl is molded by a punching process of a plate-shaped material, and wherein
the retreated portion is a shear droop generated on the second end surface side.

8. The parking lock mechanism according to claim 1, wherein
the retreated portion is a chamfered portion.

* * * * *